May 16, 1933.    B. BRONSON    1,908,682
METHOD OF MAKING COMPOSITE ARTICLES
Original Filed Dec. 20, 1929
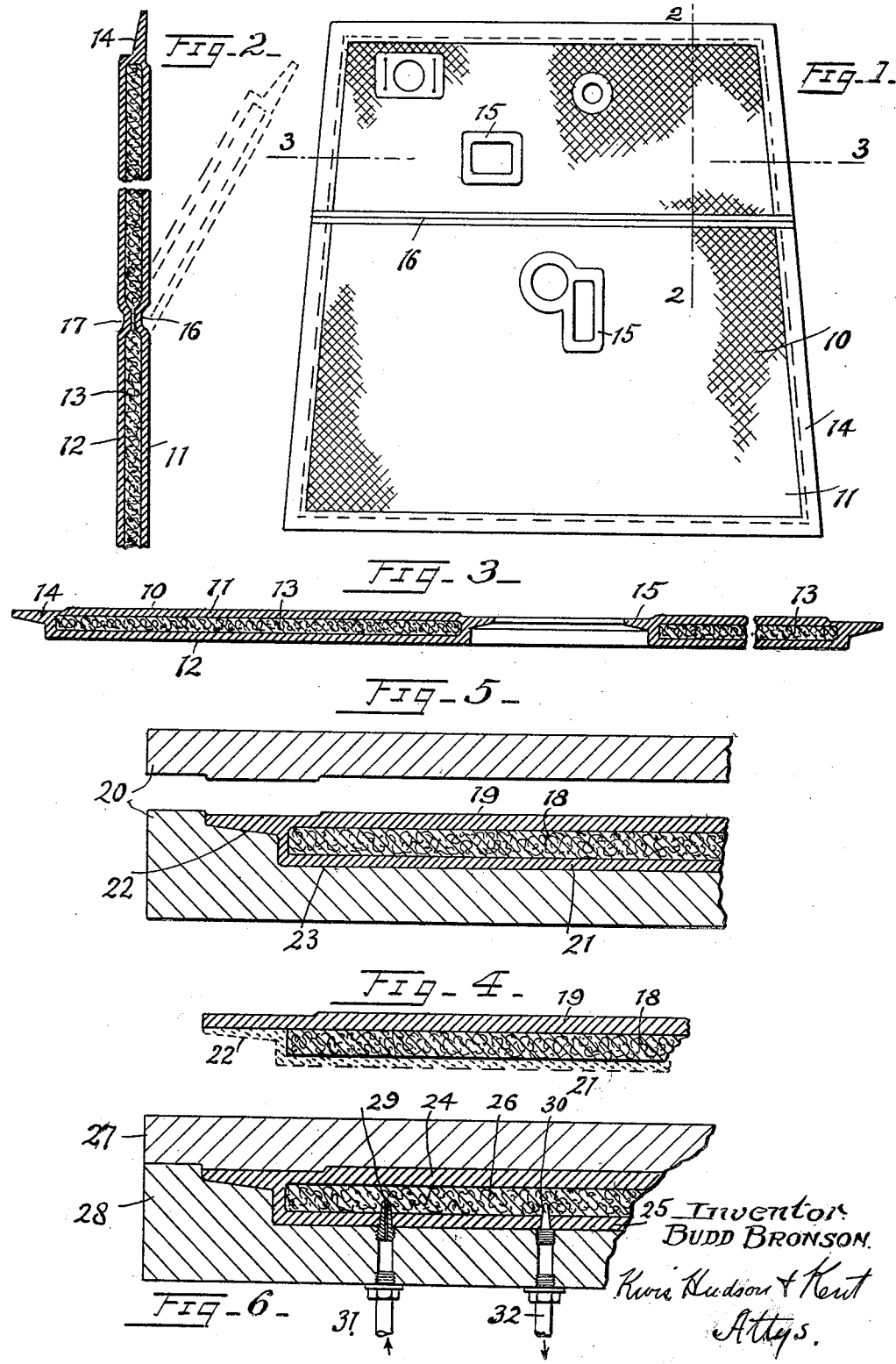

Patented May 16, 1933

1,908,682

UNITED STATES PATENT OFFICE

BUDD BRONSON, OF CLEVELAND, OHIO, ASSIGNOR TO THE OHIO RUBBER COMPANY, OF CLEVELAND, OHIO, A CORPORATION OF OHIO

METHOD OF MAKING COMPOSITE ARTICLES

Original application filed December 20, 1929, Serial No. 415,384. Divided and this application filed May 12, 1932. Serial No. 610,902.

This invention relates to composite articles, such as rubber surfaced mats and the like, and to a novel method of making these articles.

This application is a division of my co-pending original application Serial No. 415,384, filed December 20, 1929.

Rubber surfaced mats for vehicle floors and other uses, as heretofore constructed, have been formed with an exposed layer of felt, or other resilient material, secured to the under surface of a sheet of rubber. During use of this form of mat construction, the resilient material invariably mats down and loses its cushioning effect. This material also collects dust and moisture, and usually upon becoming wet emits objectionable odors.

In overcoming these difficulties I have devised a mat construction wherein an envelope is provided for the resilient material, and it may be regarded as an object of this invention to provide a novel method for the production of composite articles of the type having resilient material sealed and encased between layers of rubber.

It is also an object of this invention to provide a novel method of making composite articles, according to which pressure fluid is confined between the sheets of covering material during the vulcanizing operation.

A further object of this invention is to provide a novel method of making rubber surfaced resilient mats, in which matting of the resilient material is prevented by introducing fluid pressure between the sheets of covering material substantially simultaneously with the closing of the vulcanizing mold.

The invention may be further briefly summarized as consisting in certain novel methods and steps of procedure, hereinafter disclosed and particularly set out in the appended claims.

In the accompanying sheet of drawing, Figure 1 is a top plan view of the composite article of my invention.

Fig. 2 is a fragmentary sectional view taken on line 2—2 of Fig. 1.

Fig. 3 is a sectional view taken on line 3—3 of Fig. 1.

Fig. 4 is a partial sectional elevation illustrating operations by which my composite articles may be made.

Fig. 5 is a partial sectional elevation showing cooperating mold members used in making my composite article, and Fig. 6 is a partial sectional elevation illustrating another set of mold members which may be used in making my composite article.

In the drawing, I have shown a composite vehicle floor mat, and have illustrated diagrammatically the manner of carrying out the method of my invention, but it should be understood, however, that my invention is not limited to the particular apparatus and steps of procedure disclosed since these are susceptible of changes whereby they can be applied to the production of various composite structures.

The mat 10, which I have illustrated, comprises top and bottom sheets of rubber 11 and 12 vulcanized in contact with opposite surfaces of a layer of resilient material 13 interposed therebetween. Marginal portions of the top and bottom sheets extend beyond the edges of the layer 13 and are vulcanized together, as clearly shown in the drawing, to form the marginal portion 14 of the mat. The layer 13 may be constructed of any suitable yielding material such as felt, sponge rubber, or the like. During the vulcanizing operation, if desired, the surface of the top sheet 11 may be provided with corrugations or with any ornamental pattern or configuration. The form of mat illustrated in the drawing is intended for use in the front compartment of a motor vehicle, and is accordingly provided with openings therethrough to accommodate the usual operating levers and pedals. Portions of the sheets 11 and 12 are also vulcanized together to provide marginal portions 15 around these openings, similar in form to the marginal portions 14 formed around the outer edge of the mat. Thus it will be seen that the top and bottom sheets completely encase the layer of resilient material within an air-tight pocket. When sealed between the covering sheets in this manner, the resilient material cannot collect dust or absorb moisture and thus the resilient characteristic of this material is retained throughout its useful life.

Ordinarily, when a floor covering is fitted to the front compartment of a motor vehicle, the covering must be bent along a transverse line corresponding with the line of intersection between the surface of the inclined toe board and the surface of the usual horizontal portion of the floor. When the covering is made up of layers of material the bending upwardly of the portion of the mat which is to cover the toe board, usually causes wrinkles and bulges to occur in the top layer of material. Such wrinkles and bulges prevent proper fitting of the covering, detract from the appearance of the vehicle, and may cause uneven wearing of the surface of the covering. Therefore, to enable the mat to lie flat and to readily accommodate itself to the shape of the supporting surface, I have provided the top layer of material with a transversely extending V-shaped groove 16, and the bottom layer of material with a similar parallel groove 17. When the mat is applied to the compartment floor these grooves permit the front portion of the mat to readily adjust itself to the inclination of the toe board as indicated in dotted lines in Fig. 2. While I show the layer of resilient material compressed between the sheets of rubber along the V-shaped grooves, it may be desirable to cut or separate the layer of resilient material into two pieces along this line, in which case the portions of the sheets which form the grooves would be vulcanized together.

The floor mat which I have illustrated may be constructed in various ways, and in Figs. 4 and 5 of the drawing, I have illustrated one method which may be employed. According to this method a layer of suitable resilient material, such as a layer of felt 18, is placed in a mold member and is covered with a sheet of uncured rubber. By a molding and vulcanizing operation the uncured rubber forms the top sheet 19 which is attached to the layer of felt, as shown in full lines in Fig. 4. Thereafter, the felt, which is usually matted down by the pressure exerted during the vulcanizing operation, is treated to restore its resilience. Any suitable form of treatment may be applied to the felt, but I have found that by steaming this material the air spaces between the fibers are restored.

After the treatment of the resilient material, the partially constructed mat is placed in a suitable mold 20 on top of a sheet of uncured rubber. After closing the mold the sheet of uncured rubber is vulcanized in contact with the layer of resilient material to form the bottom sheet 21 which is molded and attached around its edge portions 22 to the top sheet 19, as indicated in Figs. 4 and 5. For the operation of molding and vulcanizing the bottom sheet, the mold is provided with a recess 23 of sufficient depth to prevent the application of heavy pressure against the sheets which would result in matting of the resilient material.

According to another method of my invention, composite articles may be constructed with an encased resilient layer formed of sponge rubber. In making this composite structure, the layer of sponge rubber is interposed between the sheets of uncured rubber and in the curing operation, the top and bottom sheets of rubber are vulcanized in contact with the layer of sponge rubber, and are secured together around their edges. The heat applied to the work during the vulcanizing operation causes gases to be given off by the sponge rubber, and since the edge portions of the sheets are in sealing engagement and prevent the escape of these gases, pressure is built up in the pocket between the sheets. This pressure confined between the top and bottom sheets of the work opposes the pressure applied to these sheets by the mold members and thus prevents matting of the fibers of the sponge rubber.

In Fig. 6 of the drawing, I have illustrated another method which may be employed in the manufacture of composite structures. According to this method, top and bottom sheets of uncured rubber 24 and 25 having a layer of resilient material 26 interposed therebetween are placed in a mold comprising mold members 27 and 28. Upon movement of the mold members to close the mold, nozzles 29 and 30 provided in suitable number on one of the mold members, pierce the bottom sheet 25 and extend into the layer of resilient material. A suitable connection 31 supplies suitable fluid pressure, such as compressed air, through the nozzle 29 into the air-tight pocket occupied by the layer of resilient material. During the vulcanizing operation, this pressure confined between the top and bottom sheets of rubber, opposes the pressure exerted upon these sheets by the mold members and prevents matting of the resilient material. Furthermore, the fluid pressure between the sheets of uncured rubber holds them against the mold members with the force which is necessary for vulcanization of the rubber, and for the formation of the pattern or ornamental design which is to appear upon the top surface of the finished article. A suitable connection 32 connects the nozzle 30 with a vacuum pump, or exhausted chamber, so that substantially simultaneously with the opening of the press, the fluid pressure confined between the sheets can be withdrawn, or released.

After the article has been removed from the mold, the holes formed by the nozzles extending through the bottom sheet may be cemented shut, or otherwise closed in any suitable manner, so that the rubber covering which encases the layer of resilient material will be air-tight.

It will now be readily seen that the resilience of the composite articles constructed according to my invention, is not impaired by matting down of the fibers during the construction of the article. It will also be seen that by encasing the layer of resilient material within an air-tight pocket formed between the cover sheets, the collection of dust and moisture is prevented with the result that the resilient material remains clean and dry and retains its cushioning effect indefinitely. It will also be apparent that the construction which I have provided permits the mat to be readily handled without disintegration, and also permits it to be washed or otherwise cleaned without resulting in damage or deterioration of the resilient material.

In disclosing my invention I have illustrated and described a floor mat for a vehicle compartment, but obviously mats constructed according to my invention may be made of any desired shape or size. Likewise, it is obvious that their useful application is not limited to vehicle floors, since they may be used on stairways, hospital floors, or wherever a yielding and cushion-like covering is needed.

In the disclosure of my invention, I have referred to "felt" as being suitable for the layer of resilient material, and by this term I mean any of the commercial felts formed of matted fibers, such as jute, either with or without a strip of burlap or other woven material incorporated therein.

While I have described the method of my invention in a detailed manner, it should be understood, however, that I do not intend to limit myself to the use of the precise steps of procedure disclosed, but that I regard my invention as including such changes and modifications as do not involve a departure from the spirit of the invention and the scope of the appended claims.

Having thus described my invention, I claim:

1. The method of making composite articles which comprises molding and vulcanizing sheets of rubber in contact with opposite surfaces of a layer of yielding material, and maintaining fluid pressure between said sheets during the vulcanizing operation to prevent matting of said yielding material.

2. The method of making composite articles which comprises molding and vulcanizing sheets of rubber in contact with opposite surfaces of a layer of yielding material, and introducing fluid pressure between said sheets substantially simultaneously with the closing of the mold to prevent matting of said yielding material during the vulcanizing operation.

3. The method of making composite articles which comprises molding and vulcanizing sheets of rubber in contact with opposite surfaces of a layer of yielding material, maintaining fluid pressure between said sheets during the vulcanizing operation to prevent matting of the yielding material, and relieving said pressure substantially simultaneously with the opening of the mold.

4. In a method of making composite articles embodying a resilient pad and a covering for the pad, the steps of pressing the covering against the pad to unite the same, and maintaining fluid pressure within the body of the pad during the application of pressure.

5. In a method of making composite articles embodying a fibrous cushion and a covering for the cushion, the steps of pressing the covering against the cushion to unite the same, and maintaining fluid pressure within the body of the cushion during the application of pressure to prevent matting of the fibers.

6. The method of making composite articles embodying a fibrous pad and a rubber covering for the pad, which comprises applying heat and pressure to the rubber covering to mold and vulcanize the same in contact with the pad, and maintaining fluid pressure within the body of the pad during the application of pressure.

7. The method of making floor mats embodying a fibrous pad and a rubber covering for the pad, which comprises molding and vulcanizing the rubber covering in contact with the pad, and maintaining fluid pressure in the body of the pad to prevent matting of the fibers and for cooperation with a portion of the mold in applying molding and vulcanizing pressure to the rubber covering.

8. The method of making mats embodying a fibrous pad and rubber covering for top and bottom surfaces thereof, which comprises vulcanizing the rubber covering in contact with the pad, and maintaining fluid pressure in said pad to prevent compression thereof and for cooperation with portions of the mold in applying vulcanizing pressure to the rubber covering.

9. The method of making mats which comprises assembling a fibrous pad between sheets of rubber, extending a fluid conductor through one of said rubber sheets, vulcanizing the rubber covering in contact with said pad, and introducing pressure fluid through said conductor at the beginning of the vulcanizing operation for cooperation with portions of the mold in applying vulcanizing pressure to the rubber covering without compressing said pad.

In testimony whereof, I hereunto affix my signature.

BUDD BRONSON.